United States Patent
Ikai et al.

(10) Patent No.: US 11,901,565 B2
(45) Date of Patent: Feb. 13, 2024

(54) FUEL CELL ELECTRODE CATALYST, METHOD FOR SELECTING THE SAME, AND FUEL CELL INCLUDING THE SAME

(71) Applicants: TOYOTA JIDOSHA KABUSHIKI KAISHA, Toyota (JP); CATALER CORPORATION, Kakegawa (JP)

(72) Inventors: Toshihiro Ikai, Okazaki (JP); Tomohiro Ishida, Hamamatsu (JP); Godai Kitayama, Hamamatsu (JP); Yousuke Horiuchi, Shimada (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 37 days.

(21) Appl. No.: 17/654,175

(22) Filed: Mar. 9, 2022

(65) Prior Publication Data

US 2022/0293966 A1  Sep. 15, 2022

(30) Foreign Application Priority Data

Mar. 11, 2021 (JP) .................................. 2021-038987

(51) Int. Cl.
*H01M 4/92* (2006.01)

(52) U.S. Cl.
CPC ........... *H01M 4/921* (2013.01); *H01M 4/926* (2013.01)

(58) Field of Classification Search
CPC .... H01M 4/921; H01M 4/926; H01M 4/9058; B01J 23/42; B01J 35/0033; B01J 35/006; C22C 5/04; C01P 2006/90

(Continued)

(56) References Cited

U.S. PATENT DOCUMENTS 6,066,410 A * 5/2000 Auer ..................... H01M 4/926
  429/492
6,156,449 A * 12/2000 Zuber ................. H01M 4/8835
  252/521.5

(Continued)

FOREIGN PATENT DOCUMENTS

JP  2003045442 A  2/2003
JP  2003201417 A  7/2003

(Continued)

OTHER PUBLICATIONS

English translation of the section "I-4-1 MEA durability (electrolyte membrane, catalyst)" which is related to the materiality, "Proposals of Goals and Tasks for Research and Development and Evaluation Method for Polymer Electrolyte Fuel Cells," (online), Jan. 2011, Fuel Cell Commercialization Conference of Japan on the Internet at URL: http://fccj.jp/pdf/23_01_kt.pdf (searched on Feb. 24, 2021).

*Primary Examiner* — Patricia L. Hailey
(74) *Attorney, Agent, or Firm* — Dickinson Wright, PLLC

(57) ABSTRACT

A fuel cell electrode catalyst includes: catalyst metal particles containing at least one of platinum or a platinum alloy; and support particles supporting the catalyst metal particles. The crystallite size 2r obtained from an X-ray diffraction image of the catalyst metal particles is 3.8 nm or less, where r represents a crystallite radius of the catalyst metal particles obtained from the X-ray diffraction image. The amount of CO adsorption Y (mL/g-Pt) on the fuel cell electrode catalyst satisfies $Y \leq 40.386/r + 1.7586$.

1 Claim, 2 Drawing Sheets

(58) Field of Classification Search
USPC .......... 502/101, 185, 325; 429/524; 420/466
See application file for complete search history.

(56) References Cited

U.S. PATENT DOCUMENTS

| | | | |
|---|---|---|---|
| 2001/0055711 A1* | 12/2001 | Ito ........................ | H01M 4/926 |
| | | | 502/185 |
| 2002/0009626 A1* | 1/2002 | Terazono ............. | B01J 35/0033 |
| | | | 429/535 |
| 2003/0044655 A1 | 3/2003 | Kato et al. | |
| 2003/0108481 A1 | 6/2003 | Igarashi et al. | |
| 2006/0264322 A1* | 11/2006 | Manthiram ........... | H01M 4/921 |
| | | | 429/525 |
| 2010/0203428 A1 | 8/2010 | Tabata et al. | |
| 2015/0295250 A1* | 10/2015 | Nagami .................. | H01M 4/92 |
| | | | 502/185 |
| 2017/0338495 A1 | 11/2017 | Horiuchi et al. | |

FOREIGN PATENT DOCUMENTS

| | | | |
|---|---|---|---|
| JP | 2004349171 A | 12/2004 | |
| JP | 2009531810 A | 9/2009 | |
| WO | 2007114494 A1 | 10/2007 | |
| WO | 2009051111 A1 | 4/2009 | |
| WO | WO2016063968 A1 | 4/2016 | |

* cited by examiner

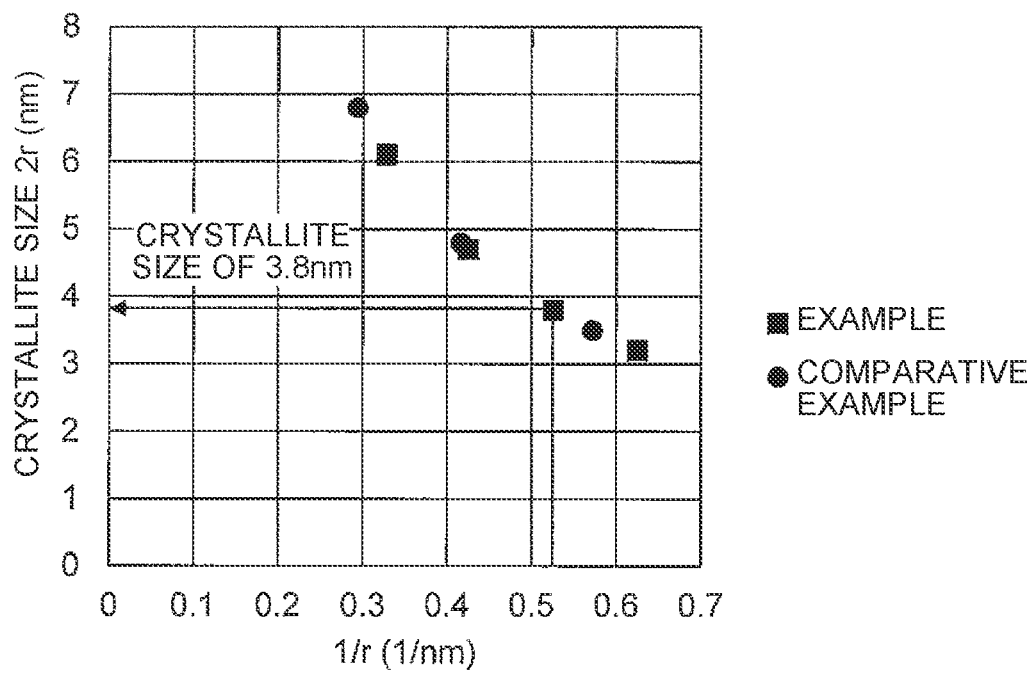
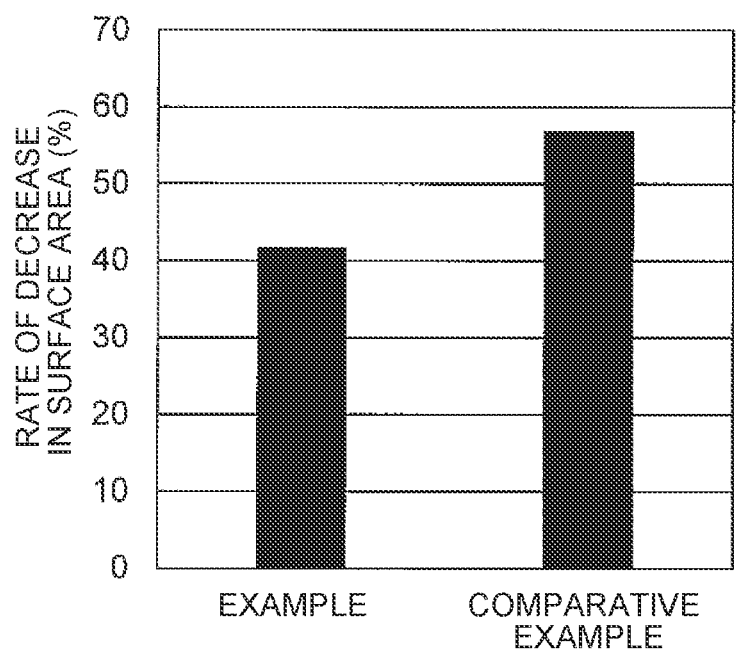

FUEL CELL ELECTRODE CATALYST, METHOD FOR SELECTING THE SAME, AND FUEL CELL INCLUDING THE SAME

CROSS-REFERENCE TO RELATED APPLICATION

This application claims priority to Japanese Patent Application No. 2021-038987 filed on Mar. 11, 2021, incorporated herein by reference in its entirety.

BACKGROUND

1. Technical Field

The present disclosure relates to fuel cell electrode catalysts, methods for selecting the same, and fuel cells including the same.

2. Description of Related Art

Polymer electrolyte fuel cells are attracting attention as an energy source. The polymer electrolyte fuel cells are fuel cells that generate electric power by an electrochemical reaction between a fuel gas and an oxidant gas. The polymer electrolyte fuel cells can operate at room temperature and have a high output density. The polymer electrolyte fuel cells are therefore being actively studied as they are suitable for automobile applications etc.

The polymer electrolyte fuel cells typically use a membrane electrode assembly ("fuel electrode-polymer electrolyte membrane-air electrode") (hereinafter also referred to as "MEA"). The MEA is formed by bonding electrodes each made of a catalyst layer (a fuel electrode (anode catalyst layer) and an air electrode (cathode catalyst layer)) to both sides of a polymer electrolyte membrane that is an electrolyte membrane. A gas diffusion layer may further be bonded to both sides of the MEA. The assembly thus obtained is also referred to as a membrane electrode gas diffusion layer assembly ("gas diffusion layer-MEA-gas diffusion layer") (hereinafter also referred to as "MEGA").

Each electrode is made of a catalyst layer. The catalyst layer is a layer for causing an electrode reaction by an electrode catalyst included in the catalyst layer. Three-phase interfaces where three phases, namely an electrolyte, an electrode catalyst, and a reactant gas, are present are required in order to cause the electrode reaction to proceed. Therefore, the catalyst layer is generally a layer including an electrode catalyst and an electrolyte. The gas diffusion layer is a layer for supplying the reactant gas to the catalyst layer and giving and receiving electrons to and from the catalyst layer, and is made of a porous, electron-conducting material.

For example, the following fuel cell electrode catalysts are disclosed as electrode catalysts for use in such polymer electrolyte fuel cells. Japanese Unexamined Patent Application Publication (Translation of PCT Application) No. 2009-531810 (JP 2009-531810 A) discloses a fuel cell electrode catalyst including a conductive support and catalyst metal particles and characterized in that the amount of CO adsorption on the electrode catalyst is 30 mL/g-Pt or more.

International Patent Publication No. WO 2016/063968 discloses a fuel cell electrode catalyst including a solid carbon support and a platinum-cobalt alloy supported on the support.

SUMMARY

Fuel cells deteriorate from use over time. One of the causes of this problem is the presence of fine particles and clusters of noble metal such as platinum and/or a platinum alloy in a fuel cell electrode catalyst that are hard to detect even by X-ray diffraction (XRD) or a transmission electron microscope (TEM). In fuel cells, the surface area of noble metal is an important physical property for fuel cell performance because the reaction occurs on the surface of active species (noble metal) on the electrode catalyst. It is known from first-principles calculation etc. that these fine particles and clusters of noble metal are more likely to dissolve than large particles of noble metal. The dissolved noble metal reprecipitates around the noble metal particles. Therefore, repeated dissolution and reprecipitation of the fine particles and clusters of noble metal would increase the particle size of the noble metal and reduce the surface area. That is, when the fuel cell electrode catalyst contains a large amount of such fine particles and clusters of noble metal that have a high rate of dissolution and cause a decrease in surface area, the fine particles and clusters of noble metal may cause deterioration of the fuel cell when used over time.

The present disclosure provides a fuel cell electrode catalyst with a reduced decrease in surface area after a durability test, a method for selecting the same, and a fuel cell including the same.

As described above, it is difficult to detect fine particles and clusters of noble metal, such as platinum and/or a platinum alloy, of about 1.5 nm or less in size in the fuel cell electrode catalyst by using XRD.

On the other hand, as shown in Table 1 below, it is possible to detect fine particles and clusters of platinum and/or a platinum alloy of about 1.5 nm or less in size in the fuel cell electrode catalyst from the amount of CO adsorption using carbon monoxide (CO) adsorption capability of platinum.

TABLE 1

Particle Information Measurement Method and Detectable Particle Size

| Analysis Method | Measured Particle Size | |
|---|---|---|
| | Clusters (1.5 nm or less) | Particles of 1.5 nm or more |
| XRD | Undetectable | Detectable as Average Particles |
| CO Pulse (Amount of CO Adsorption) | Detectable | Detectable |

The inventors found that, by specifying for a fuel cell electrode catalyst such an amount of CO adsorption that can detect fine particles and clusters of platinum and/or a platinum alloy that can cause deterioration of a fuel cell and that are hard to detect even by XRD or TEM, a fuel cell electrode catalyst having a reduced content of the fine particles and clusters of platinum and/or a platinum alloy can be selected. The inventors thus found that a fuel cell electrode catalyst with a reduced decease in surface area after a durability test can be obtained by selecting such a fuel cell electrode catalyst.

(1) A fuel cell electrode catalyst according to an aspect of the present disclosure includes: catalyst metal particles containing platinum and/or a platinum alloy; and support particles supporting the catalyst metal particles. A crystallite size 2r obtained from an X-ray diffraction image of the catalyst metal particles is 3.8 nm or less, where r represents a crystallite radius of the catalyst metal particles obtained from the X-ray diffraction image, and an amount of CO adsorption Y (mL/g-Pt) on the fuel cell electrode catalyst satisfies the following expression Y≤40.386/r+1.7586.

(2) In the fuel cell electrode catalyst according to (1), the fuel cell electrode catalyst may be an electrode catalyst for a cathode catalyst layer.

(3) A polymer electrolyte fuel cell according to another aspect of the present disclosure includes a membrane electrode assembly, the membrane electrode assembly being composed of an anode catalyst layer, a cathode catalyst layer, and a polymer electrolyte membrane interposed between the anode catalyst layer and the cathode catalyst layer. An electrode catalyst included in the cathode catalyst layer is the fuel cell electrode catalyst according to (1).

(4) A method for selecting a fuel cell electrode catalyst according to still another aspect of the present disclosure is a method for selecting a fuel cell electrode catalyst including catalyst metal particles containing platinum and/or a platinum alloy and support particles supporting the catalyst metal particles. The method includes selecting such a fuel cell electrode catalyst that a crystallite size 2r obtained from an X-ray diffraction image of the catalyst metal particles is 3.8 nm or less, where r represents a crystallite radius of the catalyst metal particles obtained from the X-ray diffraction image, and that an amount of CO adsorption Y (mL/g-Pt) on the fuel cell electrode catalyst satisfies the following expression

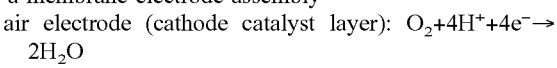

The present disclosure provides a fuel cell electrode catalyst with a reduced decrease in surface area after a durability test, a method for selecting the same, and a fuel cell including the same.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a graph showing the relationship between 1/r and crystallite size 2r calculated from XRD for the carbon-supported platinum-cobalt alloy electrode catalysts of the comparative example group and the example group; and FIG. 4 is a graph showing the rates of decrease in surface area after a durability test of the carbon-supported platinum-cobalt alloy electrode catalysts of a comparative example and an example whose crystallite size calculated from XRD is 3.2 nm.

DETAILED DESCRIPTION OF EMBODIMENTS

Figure 1:
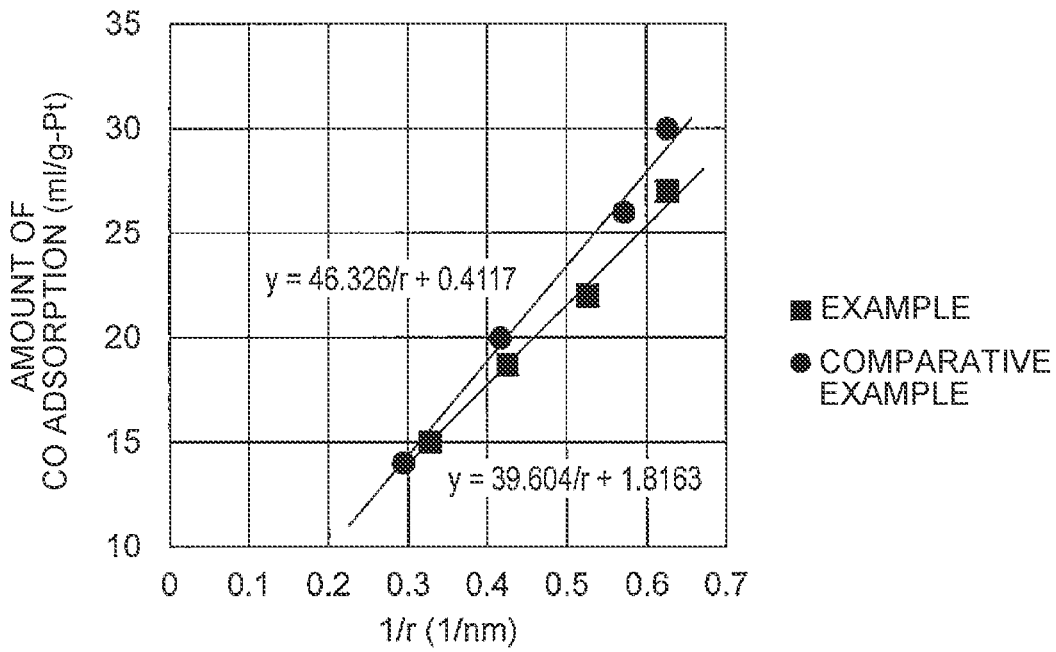
FIG. 1 is a graph showing the relationship between 1/r calculated from XRD and the amount of CO adsorption for carbon-supported platinum-cobalt alloy electrode catalysts of a comparative example group and an example group.

Hereinafter, an embodiment of the present disclosure will be described in detail. A fuel cell electrode catalyst, a method for selecting the same, and a fuel cell including the same according to the present disclosure are not limited to the following embodiment, and can be carried out in various forms such as modified or improved forms that can be made by those skilled in the art without departing from the spirit and scope of the disclosure.

The present disclosure relates to a fuel cell electrode catalyst including catalyst metal particles and support particles supporting the catalyst metal particles, the catalyst metal particles containing platinum and/or a platinum alloy. The crystallite size 2r (nm) obtained from an X-ray diffraction image of the catalyst metal particles is equal to or smaller than a certain value, and the amount of CO adsorption Y (mL/g-Pt) on the fuel cell electrode catalyst satisfies a relationship given by a certain expression.

The catalyst metal particles are not limited as long as they contain platinum and/or a platinum alloy and exhibit a catalytic function in the following reactions at the electrodes of a membrane electrode assembly air electrode (cathode catalyst layer): $O_2+4H^++4e^-\rightarrow 2H_2O$ hydrogen electrode (anode catalyst layer): $2H_2\rightarrow 4H^++4e^-$ Catalyst metal particles known in the art can be used as the catalyst metal particles in the present disclosure.

Examples of the platinum alloy include, but are not limited to, alloys of platinum and at least one of aluminum, chromium, manganese, iron, cobalt, nickel, gallium, zirconium, molybdenum, ruthenium, rhodium, palladium, vanadium, tungsten, rhenium, osmium, iridium, titanium, and lead.

In addition to platinum and/or a platinum alloy, the catalyst metal particles may contain, for example, palladium, rhodium, gold, silver, osmium, iridium, or a mixture of two or more of these substances.

The catalyst metal particles are preferably made of platinum and/or a platinum alloy such as an alloy of platinum and cobalt.

The support particles are not limited, and a support known in the art can be used as the support particles in the present disclosure. Examples of the support particles include: carbon materials such as carbon black, carbon nanotubes, and carbon nanofibers; carbon compounds such as silicon carbide; tin oxide; and mixtures of two or more of these substances.

The Brunauer-Emmett-Teller (BET) specific surface area of the support particles is usually, but is not limited to, 600 m²/g to 900 m²/g.

The content of the catalyst metal particles is usually, but is not limited to, 5 wt % to 70 wt %, preferably 10 wt % to 60 wt %, based on the total weight of the fuel cell electrode catalyst.

The crystallite size 2r (nm) obtained from an X-ray diffraction (XRD) image of the catalyst metal particles is 3.8 nm or less, preferably 3.5 nm or less. Regarding the crystallite size 2r, r represents the crystallite radius of the catalyst metal particles obtained from an XRD diffraction image of the catalyst metal particles.

The crystallite size 2r (nm) obtained from an X-ray diffraction image of the catalyst metal particles can be calculated using a technique known in the art. For example, the crystallite size 2r (nm) can be obtained from an X-ray diffraction image of the catalyst metal particles as follows. The fuel cell electrode catalyst is pressed and fixed to a measurement cell such as a glass cell, an X-ray diffraction image is obtained by measurement with an X-ray diffractometer such as RINT-TTR III (made by Rigaku Corporation), and the line width of a peak derived from the catalyst metal particles is calculated from the obtained X-ray diffraction image as a crystallite size using the Scherrer formula.

The amount of CO adsorption Y (mL/g-Pt) on the fuel cell electrode catalyst satisfies the following expression $$Y \leq 40.386/r + 1.7586$$

and preferably satisfies the following expression $$Y \leq 39.604/r + 1.8163.$$

CO is uniformly adsorbed on the platinum surface. The amount of CO adsorption Y (mL/g-Pt) on the fuel cell electrode catalyst therefore roughly indicates the specific surface area of platinum particles in the fuel cell electrode catalyst. Accordingly, the amount of CO adsorption Y (mL/g-Pt) on the fuel cell electrode catalyst is proportional to (1/radius r) of the platinum particles, as given by the following expression 1.

Amount of CO adsorption $Y \approx$ specific surface area of Pt=$4\pi r^2 \times$[total volume of Pt/$(4/3\pi r^3)$]=(3×total volume of Pt)/$r$    Expression 1

(In the expression, $4\pi r^2$ represents the surface area per platinum particle, and [total volume of Pt/$(4/3\pi r^3)$] represents the number of platinum particles.)

The amount of CO adsorption Y (mL/g-Pt) on the fuel cell electrode catalyst can be calculated using a technique known in the art. The amount of CO adsorption Y (mL/g-Pt) on the fuel cell electrode catalyst can be measured by, for example, the following method. First, the fuel cell electrode catalyst is placed in a CO adsorption amount measuring device such as BEL-METAL-3 (made by MicrotracBEL Corp.), the measurement atmosphere is replaced with helium (He) gas, and the fuel cell electrode catalyst is degassed at 80° C. for 24 minutes. Next, a pre-reduction treatment is carried out for 30 minutes with 4% $H_2$—He balanced gas. The temperature after the pre-reduction treatment is then changed to 30° C., and pulse chemisorption measurement is carried out with CO gas to calculate the amount of CO adsorption per weight of platinum.

In the fuel cell electrode catalyst of the present disclosure, the crystallite size 2r (nm) obtained from an X-ray diffraction image of the catalyst metal particles and the amount of CO adsorption Y (mL/g-Pt) of the fuel cell electrode catalyst are within the ranges specified above. The fuel cell electrode catalyst of the present disclosure therefore has a lower content of fine particles and clusters of platinum and/or a platinum alloy that may cause deterioration of a fuel cell than conventional fuel cell electrode catalysts. As a result, a decrease in surface area after a durability test of the fuel cell electrode catalyst can be reduced.

The fuel cell electrode catalyst of the present disclosure can be used as an electrode catalyst for a cathode catalyst layer and/or an anode catalyst layer in a fuel cell. The fuel cell electrode catalyst of the present disclosure is preferably used as an electrode catalyst for a cathode catalyst layer in a fuel cell. By using the fuel cell electrode catalyst of the present disclosure as an electrode catalyst for a cathode catalyst layer, dissolution of noble metal in the cathode catalyst layer in which the noble metal, particularly platinum and/or a platinum alloy, may dissolve is reduced, and durability of the fuel cell can be improved.

The fuel cell electrode catalyst of the present disclosure can be manufactured by a known method except that the BET specific surface area of the support particles is 600 $m^2/g$ to 900 $m^2/g$ and that such catalyst metal particle-supporting particles that the crystallite size 2r (nm) obtained from an X-ray diffraction image of the catalyst metal particles and the amount of CO adsorption Y (mL/g-Pt) on the fuel cell electrode catalyst are within the ranges specified above are selected from produced catalyst metal particle-supporting particles.

For example, the fuel cell electrode catalyst of the present disclosure can be prepared as follows.

(1) Support particles with a specific BET specific surface area such as carbon particles and a platinum precursor such as a dinitrodiammine platinum nitric acid solution are suspended in a solvent such as pure water to obtain a suspension.

(2) The platinum precursor in the suspension produced in (1) is reduced to a noble metal at normal room temperature (about 20° C.) to 100° C. using a reducing agent such as ethanol or sodium borohydride to obtain a dispersion. When the noble metal in the fuel cell electrode catalyst is a platinum alloy, a solution containing a metal contained in the alloy, such as cobalt, in the form of ions is added to the dispersion, and the pH etc. of the resultant dispersion is adjusted to precipitate the metal in the form of hydroxides, carbonates, etc.

(3) The dispersion obtained in (2) is filtered, and the cake is dried usually at 80° C. to 120° C. usually for 1 hour to 12 hours into a powder.

(4) The powder obtained in (3) is fired in an inert atmosphere such as a nitrogen or argon atmosphere usually at 100° C. to 1200° C. usually for 1 hour to 8 hours to obtain catalyst metal particle-supporting particles. The firing of (4) is performed in order to improve durability of the fuel cell electrode catalyst when used at high temperatures. The firing is performed within the range in which the pore diameter and pore volume of the support particles do not change, and is preferably performed under the conditions mentioned in (4). When the catalyst metal particle-supporting particles obtained in (4) contain impurities such as the metal added in (2), the catalyst metal particle-supporting particles obtained in (4) can be added to a solution containing an acid, a base, etc. The impurities can thus be dissolved in the solution and removed.

(5) Such catalyst metal particle-supporting particles that the crystallite size 2r (nm) obtained from an X-ray diffraction image of the catalyst metal particles and the amount of CO adsorption Y (mL/g-Pt) on the fuel cell electrode catalyst are within the ranges specified above are selected from the catalyst metal particle-supporting particles obtained in (4).

The present disclosure also relates to a fuel cell including the fuel cell electrode catalyst of the present disclosure, that is, a polymer electrolyte fuel cell including a membrane electrode assembly composed of an anode catalyst layer, a cathode catalyst layer, and a polymer electrolyte membrane interposed between the anode catalyst layer and the cathode catalyst layer, an electrode catalyst of the anode catalyst layer and/or the cathode catalyst layer being the fuel cell electrode catalyst of the present disclosure.

The polymer electrolyte membrane is preferably a proton-conducting electrolyte membrane. The proton-conducting electrolyte membrane can be a proton-conducting electrolyte membrane known in the art. Examples of the proton-conducting electrolyte membrane include, but are not limited to, membranes made of fluororesin containing sulfonic acid groups that are an electrolyte (such as Nafion (made by DuPont), FLEMION (made by AGC), and Aciplex (made by Asahi Kasei Corporation)).

The thickness of the polymer electrolyte membrane is usually, but is not limited to, 5 μm to 50 μm in order to improve the function of the proton conductivity.

The anode catalyst layer serves as a fuel electrode, that is, a hydrogen electrode, the cathode catalyst layer serves as an air electrode (oxygen electrode), and each catalyst layer includes an electrode catalyst and an electrolyte.

The anode catalyst layer and/or the cathode catalyst layer includes the fuel cell electrode catalyst of the present disclosure as an electrode catalyst, and the fuel cell electrode catalyst of the present disclosure is as described above.

When the anode catalyst layer or the cathode catalyst layer does not include the fuel cell electrode catalyst of the present disclosure as an electrode catalyst, the electrode catalyst of the anode catalyst layer or the cathode catalyst layer can be an electrode catalyst known in the art.

In the polymer electrolyte fuel cell of the present disclosure, the cathode catalyst layer preferably includes the fuel cell electrode catalyst of the present disclosure. As the cathode catalyst layer includes the fuel cell electrode catalyst of the present disclosure, dissolution of noble metal in the cathode catalyst layer in which the noble metal, particularly platinum and/or a platinum alloy, may dissolve is reduced, and durability of the fuel cell can be improved.

The content of the electrode catalyst in each catalyst layer is usually, but is not limited to, 5 wt % to 40 wt % based on the total weight of the catalyst layer.

The electrolyte is preferably, but is not limited to, an ionomer. An ionomer is also called cation exchange resin and exists in clusters of ionomer molecules. An ionomer known in the art can be used as the ionomer of the present disclosure. Examples of the ionomer include, but are not limited to: fluororesin electrolytes such as a perfluorosulfonic acid resin material; sulfonated plastic electrolytes such as sulfonated polyether ketone, sulfonated polyether sulfone, sulfonated polyether ether sulfone, sulfonated polysulfone, sulfonated polysulfide, and sulfonated polyphenylene; sulfoalkylated plastic electrolytes such as sulfoalkylated polyether ether ketone, sulfoalkylated polyether sulfone, sulfoalkylated polyether ether sulfone, sulfoalkylated polysulfone, sulfoalkylated polysulfide, and sulfoalkylated polyphenylene; and mixtures of two or more of these substances.

The thickness of each catalyst layer is usually, but is not limited to, 1 µm to 20 µm in order to provide the amount of catalyst required for power generation and to maintain low proton resistance.

The polymer electrolyte fuel cell of the present disclosure can be manufactured by a method known in the art.

For example, the polymer electrolyte fuel cell of the present disclosure can be prepared as follows.

(1) The fuel cell electrode catalyst of the present disclosure and an electrolyte such as an electrolyte containing the same components as those of a polymer electrolyte membrane are suspended in a solvent such as pure water to prepare a catalyst ink. At this time, ultrasonic dispersion etc. may be used in order to obtain a uniform catalyst ink.

(2) The catalyst ink obtained in (1) is sprayed to, or is caused to adhere to, a peelable base material such as a Teflon sheet to form a catalyst layer precursor. For example, a method using gravity, spraying force, or electrostatic force can be used for the spraying and adhesion.

(3) The catalyst layer precursor on the base material is dried to prepare a catalyst layer on the base material, and the catalyst layer is peeled off from the base material. The catalyst layer is thus obtained.

In (2) to (3), the catalyst layer is obtained by spraying the catalyst ink to, or causing the catalyst ink to adhere to, the base material and then performing drying and peeling the catalyst layer off. Alternatively, the catalyst layer may be prepared by spraying the catalyst ink directly to, or causing the catalyst ink to adhere directly to, the surface of the polymer electrolyte membrane, and then performing drying.

(4) The catalyst layer obtained in (3) is used as an air electrode, and for example, the catalyst layer obtained in (3) or a catalyst layer prepared using a commercially available Pt/C catalyst instead of the fuel cell electrode catalyst of the present disclosure of (1) is used as a fuel electrode. A layer assembly is obtained by placing the air electrode on one surface of the polymer electrolyte membrane and placing the fuel electrode on the other surface of the polymer electrolyte membrane. In some cases, a diffusion layer such as a conductive porous sheet may be placed outside each of the air electrode and the fuel electrode. The conductive porous sheet is, for example, a sheet made of an air or liquid permeable material such as carbon cloth or carbon paper.

(5) The layer stack obtained in (4), namely the assembled stack of (the diffusion layer), the air electrode, the polymer electrolyte membrane, and the fuel electrode, (and the diffusion layer), is usually bonded together usually at 100° C. to 200° C., for example, 140° C., usually for 5 seconds to 600 seconds, for example, 300 seconds, by hot press to obtain a membrane electrode assembly or an MEGA (6) Separators along which gas flows are placed on both sides of the membrane electrode assembly or MEGA obtained in (5). The polymer electrolyte fuel cell is obtained by stacking a plurality of the single cells.

The polymer electrolyte fuel cell of the present disclosure has improved durability and power generation performance.

Hereinafter, some examples of the present disclosure will be described, but these examples are not intended to limit the present disclosure to the forms shown in the examples.

1. Sample Preparation

Preparation of Carbon-Supported Platinum-Cobalt Alloy Electrode Catalysts of Comparative Example Group (Conventional Products)

A carbon support (BET specific surface area: 1000 m$^2$/g to 1300 m$^2$/g) as support particles was suspended in dilute nitric acid. Thereafter, a dinitrodiammine platinum nitric acid solution was added to the suspension, and the resultant suspension was stirred. Ethanol was further added to this suspension, and the resultant suspension was heated (room temperature (about 20° C.) to 100° C.). Platinum ions were reduced by the reducing action of ethanol to obtain platinum-supporting carbon.

This platinum-supporting carbon was suspended in a cobalt nitrate solution. A basic solution such as ammonia was then added to the suspension, and the pH of the resultant suspension was adjusted to 7 or more to precipitate cobalt in the form of cobalt hydroxide on the platinum-supporting carbon. Thereafter, the suspension was filtered to obtain platinum-supporting carbon with cobalt hydroxide adsorbed thereon.

The platinum-supporting carbon with cobalt hydroxide adsorbed thereon was dried at 80° C. to 120° C. for 1 hour to 12 hours. The powder thus obtained was fired at 100° C. to 1200° C. for 1 hour to 8 hours in an inert gas (nitrogen or argon) atmosphere to form an alloy of platinum and cobalt. Platinum-cobalt alloy-supporting carbon was thus obtained.

The obtained platinum-cobalt alloy-supporting carbon was suspended in dilute nitric acid, and the suspension was adjusted to the temperature range of room temperature (about 20° C.) to 100° C. The suspension was stirred for 30 minutes or more to remove cobalt from the surfaces of the alloy particles. A carbon-supported platinum-cobalt alloy electrode catalyst was thus obtained.

Preparation of Carbon-Supported Platinum-Cobalt Alloy Electrode Catalysts of Example Group (Including Reference Examples)

Carbon-supported platinum-cobalt alloy electrode catalysts of an example group were prepared in a manner similar to that of the carbon-supported platinum-cobalt alloy electrode catalysts of the comparative example group except that a carbon support (BET specific surface area: 600 m$^2$/g to 900 m$^2$/g) was used as support particles instead of the carbon support (BET specific surface area: 1000 m$^2$/g to 1300 m$^2$/g) used as support particles to prepare the carbon-supported platinum-cobalt alloy electrode catalysts of the comparative example group.

As shown in the results described below, examples of the example group are carbon-supported platinum-cobalt alloy electrode catalysts whose crystallite size calculated from XRD is 3.8 nm or less and which have the effects of the present disclosure, particularly the effect of reducing a decrease in surface area after a durability test, and reference examples of the example group are carbon-supported platinum-cobalt alloy electrode catalysts whose crystallite size calculated from XRD is larger than 3.8 nm.

2. Analysis

XRD

XRDs of the carbon-supported platinum-cobalt alloy electrode catalysts of the comparative example group and the example group were measured by the following method. Each carbon-supported platinum-cobalt alloy electrode catalyst was pressed and fixed to a glass cell, an X-ray diffraction image was obtained by measurement with an X-ray diffractometer (RINT-TTR III (made by Rigaku Corporation)), and the line width of a peak derived from the platinum-cobalt alloy was calculated from the obtained X-ray diffraction image as a crystallite size 2r (nm) using the Scherrer formula. The value of 1/r was then calculated.

Amount of CO Adsorption

The amounts of CO adsorption on the carbon-supported platinum-cobalt alloy electrode catalysts of the comparative example group and the example group were measured by the following method. First, each carbon-supported platinum-cobalt alloy electrode catalyst was placed in a CO adsorption amount measuring device (BEL-METAL-3 (made by MicrotracBEL Corp.)), the measurement atmosphere was replaced with helium (He) gas, and the carbon-supported platinum-cobalt alloy electrode catalyst was degassed at 80° C. for 24 minutes. Next, a pre-reduction treatment was carried out for 30 minutes with 4% H$_2$—He balanced gas. The temperature after the pre-reduction treatment was then changed to 30° C., and pulse chemisorption measurement was carried out with CO gas to calculate the amount of CO adsorption per weight of platinum.

Measurement of Rate of Decrease in Surface Area After Durability Test

Regarding the carbon-supported platinum-cobalt alloy electrode catalysts of the comparative example group and the example group, load response durability was evaluated based on the method described in the section "I-4-1 MEA durability (electrolyte membrane, catalyst)" of "Proposals of Goals and Tasks for Research and Development and Evaluation Method for Polymer Electrolyte Fuel Cells," (online), January 2011, Fuel Cell Commercialization Conference of Japan on the Internet at URL: http://fccj.jp/pdf/23_01_kt.pdf (searched on Feb. 24, 2021), and a change in surface area of platinum before and after the evaluation was examined.

Specifically, MEGAs were first produced using each of the carbon-supported platinum-cobalt alloy electrode catalysts of the comparative example group and the example group. Next, cyclic voltammetry (CV) was performed on each of the obtained MEGAs to calculate the electrochemically active surface area (ECSA) of platinum. Subsequently, a potential cycling test (durability test) was performed on each MEGA under the following test conditions. After the potential cycling test, CV was performed again on each MEGA to calculate the ECSA of platinum. The rate of decrease in surface area after the durability test of each carbon-supported platinum cobalt alloy electrode catalyst was calculated based on the ECSAs of platinum from the CV before and after the potential cycle test.

Test Conditions

Figure 2:
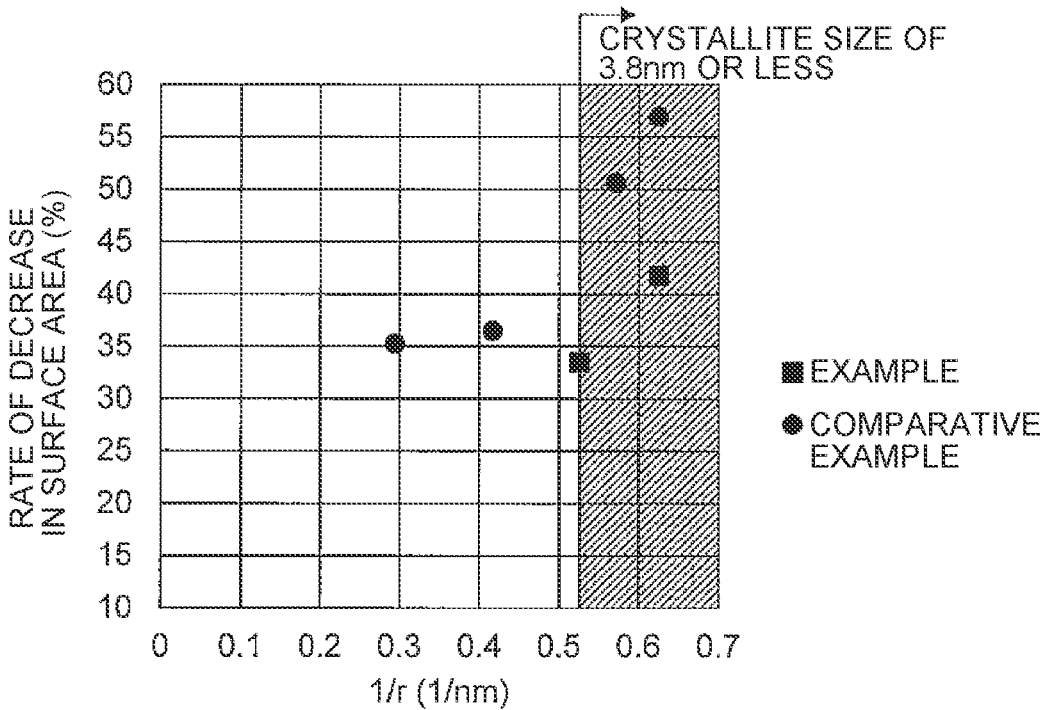
FIG. 2 is a graph showing the relationship between 1/r calculated from XRD and the rate of decrease in surface area after a durability test for the carbon-supported platinum-cobalt alloy electrode catalysts of the comparative example group and the example group.

Temperature: 80° C.
Gas pressure: normal pressure
Relative humidity: 100%
Anode: H$_2$
Cathode: N$_2$
Load response: 0.6 V to 1.0 V
Number of cycles: 100,000 cycles 3. Results For the carbon-supported platinum-cobalt alloy electrode catalysts of the comparative example group and the example group, FIG. 1 shows the relationship between 1/r calculated from XRD and the amount of CO adsorption, FIG. 2 shows the relationship between 1/r calculated from XRD and the rate of decrease in surface area after a durability test, and FIG. 3 shows the relationship between 1/r and crystallite size 2r calculated from XRD. FIG. 4 shows the rates of decrease in surface area after a durability test of the carbon-supported platinum-cobalt alloy electrode catalysts of the comparative example and the example whose crystallite size calculated from XRD is 3.2 nm.

The results of FIG. 1 show that, in the comparative example group and the example group, there is a proportional relationship between 1/r calculated from XRD and the amount of CO adsorption Y. Comparison between the expression of an approximate straight line of the comparative example group (y=46.326/r+0.4117) and the expression obtained from the carbon-supported platinum-cobalt alloy electrode catalyst in the example group with a crystallite size 2r of 6.1 nm (1/r=0.328) and the carbon-supported platinum-cobalt alloy electrode catalyst in the example group with a crystallite size 2r of 3.2 nm (1/r=0.625) (y=40.386/r+ 1.7586), preferably the expression of an approximate straight line of the example group (y=39.604/r+1.8163) showed that the slope of the expression of the example group, preferably the slope of the expression of the approximate straight line of the example group, is smaller than the slope of the expression of the approximate straight line of the comparative example group.

This means that the carbon-supported platinum-cobalt alloy electrode catalysts of the comparative example group whose 1/r calculated from XRD is the same as 1/r of the carbon-supported platinum-cobalt alloy electrode catalyst of the example group has a larger amount of CO adsorption than the carbon-supported platinum-cobalt alloy electrode catalyst of the example group.

That is, it is difficult to detect fine particles and clusters of platinum and/or a platinum alloy of 1.5 nm or less in size by XRD, but it is possible to detect fine particles and clusters of platinum and/or a platinum alloy of 1.5 nm or less in size from the amount of CO adsorption using CO adsorption capability of platinum. In view of this, the fact that the amount of CO adsorption of the carbon-supported platinum-cobalt alloy electrode catalyst of the comparative example group is larger than the amount of CO adsorption of the carbon-supported platinum-cobalt alloy electrode catalyst of the example group means that the carbon-supported platinum-cobalt alloy electrode catalyst of the comparative example group contains more fine particles and clusters of platinum and/or a platinum alloy of 1.5 nm in size that are not detected by XRD than the carbon-supported platinum-cobalt alloy electrode catalyst of the example group.

Accordingly, it was found from FIG. 1 that a carbon-supported platinum-cobalt alloy electrode catalyst contains less fine particles and clusters of platinum and/or a platinum alloy of 1.5 nm in size that are not detected by XRD than conventional electrode catalysts when the amount of CO adsorption Y of the carbon-supported platinum-cobalt alloy electrode catalyst is equal to or smaller than the value of y obtained by substituting $1/r$ calculated from XRD for the expression of the example group ($y=40.386/r+1.7586$), preferably the expression of the approximate straight line of the example group ($y=39.604/r+1.8163$), that is, when the amount of CO adsorption Y of the carbon-supported platinum-cobalt alloy electrode catalyst satisfies $Y \leq 40.386/r+1.7586$, preferably $Y \leq 39.604/r+1.8163$.

The results of FIG. 2 show that the difference in rate of decrease in surface area after the durability test between the example group and the comparative example group was more significant when $1/r$ was 0.52 or more, that is, when the crystallite size 2r calculated from FIG. 3 was 3.8 nm or less.

The results of FIG. 4 also show that the carbon-supported platinum-cobalt alloy electrode catalyst of the example has a lower rate of decrease in surface area after the durability test than the carbon-supported platinum-cobalt alloy electrode catalyst of the comparative example when $1/r$ calculated from XRD is the same.

What is claimed is:

1. A polymer electrolyte fuel cell comprising a membrane electrode assembly, the membrane electrode assembly being composed of an anode catalyst layer, a cathode catalyst layer, and a polymer electrolyte membrane interposed between the anode catalyst layer and the cathode catalyst layer, wherein an electrode catalyst included in the cathode catalyst layer is the fuel cell electrode catalyst, wherein the electrolyte is an ionomer, and wherein the fuel cell electrode catalyst comprises:
   catalyst metal particles containing at least one of platinum or a platinum alloy; and
   support particles supporting the catalyst metal particles, wherein:
   a crystallite size 2r obtained from an X-ray diffraction image of the catalyst metal particles is 3.8 nm or less, where r represents a crystallite radius of the catalyst metal particles obtained from the X-ray diffraction image; and
   an amount of CO adsorption Y (mL/g-Pt) on the fuel cell electrode catalyst satisfies the following expression $Y \leq 40.386/r+1.7586$.

* * * * *